2,903,434

DECOLORIZING CLAYS

Gunter H. Gloss, deceased, late of Mundelein, Ill., by Frithie Gloss, administrator, Downey, Ill., and Rudolf Ittlinger, Highland Park, Ill., assignors to International Minerals & Chemical Corporation, a corporation of New York No Drawing. Application April 22, 1957
Serial No. 654,428

10 Claims. (Cl. 252—441)

This invention relates to the method of preparing activated montmorillonite clay and the activated clay product produced thereby. More particularly, this invention relates to the method of activating montmorillonite clay with an aqueous solution of a fluorine constituent and a mineral acid, and the new composition produced thereby. The terms "activated clay" or "bleaching clay" as used in the oil industry refer to clays which have been treated physically or chemically in such a manner that the finished product has the capacity for absorbing colored matter from the oil.

Activated montmorillonite clay, suitable for use in decolorizing oil, has been prepared by digesting clay in an aqueous solution of sulfuric acid or hydrochloric acid. During digestion of the clay, cations such as iron, aluminum, magnesium, and calcium may be solubilized. At the same time, the silicate lattice of the clay may be "opened up" so that colored organic bodies of certain molecular constituents such as chromophoric groups and sulfur groups in oils, may be absorbed readily when brought into contact with the activated product.

When sulfuric acid or hydrochloric acid solutions are used to activate montmorillonite clay, a substantial portion of the cost of preparation is derived from the acid cost. Therefore, a reduction in the amount of acid necessary to accomplish activation may substantially reduce the cost of preparing the activated product.

Generally, the activity of most montmorillonite clays increases directly with the quantity of sulfuric or hydrochloric acid used in the activation step. However, when large amounts of sulfuric acid or hydrochloric acid are necessary to obtain the desired degree of activity, a substantial amount of clay components may be solubilized and are lost in the leaching solution.

Another disadvantage inherent in the use of sulfuric acid or hydrochloric acid solutions is that these acids are not capable of activating certain types of montmorillonite clays. In other instances, a prohibitive amount of one of these acids is necessary to obtain the desired degree of activation.

It is an object of the present invention to overcome the disadvantages inherent in previously known methods of activating montmorillonite clay suitable for use in removing colored bodies from oils.

It is another object of the invention to provide an improved method of activating montmorillonite clay suitable for use in decolorizing oils.

Still another object of the invention is to provide a method of activating montmorillonite clays which heretofore could not be activated on a commercial scale.

Another object of the invention is to provide a method of activating montmorillonite clay in which improved recovery of the clay is obtained after activation treatment.

These and other objects of the invention will become apparent upon a more complete understanding of the following description of the invention.

A novel method of manufacture and composition of an activated montmorillonite clay having improved oil decolorizing properties has been discovered. An improved activated clay may be prepared by digesting montmorillonite clay in an aqueous solution containing an acidic fluorine constituent and a mineral acid selected from the group consisting of hydrochloric acid and sulfuric acid. Digestion of the clay in the activating solution is carried out at a temperature near the boiling point for at least about 4 hours. After digestion is completed, clay is separated from the solution and washed with water until substantially free of any activating solution which may adhere to the surface of clay particles. Wash water is decanted and the clay is heated to dryness.

More in detail, a clay having as its chief mineral constituent montmorillonite, which possesses the idealized formula $Al_2Si_4O_{10}(OH)_2 \cdot nH_2O$, is suitable for use in the instant process. In the United States, montmorillonite clays are generally found in deposits near the earth's surface and may be mined by a suitable means such as a power shovel. A typical montmorillonite clay suitable for use in the instant process is "Cheto" clay (sometimes referred to as "Chito" clay) which is found in deposits in the region adjacent to Sanders, Arizona. A typical analysis of this clay on a dry basis is as follows.

| Component: | Percent by weight |
|---|---|
| $SiO_2$ | 59.7 |
| $Fe_2O_3$ | 0.70 |
| $Al_2O_3$ | 17.9 |
| $CaO$ | 2.74 |
| $MgO$ | 5.97 |
| $Cl$ | 0.04 |
| Loss on ignition @ 900° C | 10.47 |

Montmorillonite clay, such as Cheto clay, may contain as much as 35% moisture by weight when mined. After mining by power shovel or the like, the clay may be subjected to a size reduction step. In this step, the clay is reduced to a particle size less than about 1½" in diameter in a suitable apparatus such as a hammer mill, and conveyed to the processing plant. If the processing plant is not located adjacent to the mining site, it may be more economical from the standpoint of freight costs to dry the clay at the mine site prior to shipping to the processing plant. Drying of the clay to a moisture content of about 5% by weight may be accomplished in a suitable apparatus such as an oil fired rotating dryer.

Clay which has been mined and subjected to a size reduction step, or clay which has been dried after mining, as the case may be, is reacted with an activating solution as described more fully below. It is preferred that the clay be subjected to the activating step as soon as possible after mining, since decolorizing efficiency of activated montmorillonite clay may decrease if clay is stored prior to activation for a prolonged period, for example, about 2 months.

The term "activating solution" used throughout this specification refers to an aqueous solution of an acidic fluorine constituent and a mineral acid, or mixtures thereof, selected from the group consisting of hydrochloric acid, sulfuric acid, and phosphoric acid, in particular, wet process crude phosphoric acid containing fluorine compounds derived from the starting phosphate rock.

Montmorillonite clay is activated by treatment with an aqueous solution of an acidic fluorine constituent and a mineral acid selected from the group consisting of hydrochloric acid and sulfuric acid. Suitable acidic fluorine compounds include fluosilicic acid, hydrofluoric acid, silicon tetrafluoride, ammonium bifluoride and the like. Additionally, neutral fluorides and fluosilicates such as ammonium fluoride, calcium fluoride, sodium fluoride, aluminum fluoride, sodium, ammonium, calcium, aluminum fluosilicates, and the like, may be employed provided sufficient mineral acid is employed to not only activate the clay but to produce hydrogen fluoride in situ from the neutral fluorides and fluosilicates. Also, mixtures of acidic fluorides or neutral fluorides and fluosilicates with each other or with themselves may be used. It is preferred that the activating solution contain sufficient fluorine material to provide an amount equivalent to a weight ratio of between about 2 and about 15 parts of fluorine compound per 100 parts of clay. When montmorillonite clay is reacted with an activating solution containing fluosilicic acid in an amount in excess of about 15 parts of $H_2SiF_6$ per 100 parts of clay, activation of the clay may still be accomplished. However, when an excessive amount of fluosilicic acid is used, a gelatinous precipitate may form during the activation step which seriously hinders separation of clay from the activating solution by filtration or the like. When clay is activated with an activating solution containing hydrofluoric acid in excess of about 15 parts HF per 100 parts of clay, satisfactory activation of the clay may be accomplished, but there may also be excessive solubilization of the clay.

It is preferred that the activating solution contain sufficient mineral acid to provide an amount equivalent to a weight ratio of between about 5 and about 25 parts of mineral acid per 100 parts of clay. When montmorillonite clay is treated with an activating solution containing hydrochloric acid or sulfuric acid in an amount in excess of about 25 parts of acid per 100 parts of clay, satisfactory activation of the clay may be accomplished, but there may also be excessive solubilization of the clay.

In order to accomplish the desired degree of activation of the clay, the sum of parts of fluorine compound and mineral acid in the activating solution should be equivalent to a weight ratio of at least about 12 parts per 100 parts of clay.

Activating solutions are generally aqueous solutions containing mixtures of a fluorine constituent and a mineral acid in quantities specified above. These activating solutions may be prepared by mixing an aqueous solution of a fluorine compound with an aqueous solution of a mineral acid. Activating solutions may also be prepared by passing a fluorine-containing gas and a gas containing a mineral acid ion through an aqueous medium to form an aqueous solution of a fluoride compound and a mineral acid. For example, gaseous silicon tetrafluoride and gaseous hydrochloric acid may be passed through an aqueous medium to form an aqueous solution of a mixture of fluosilicic acid and hydrochloric acid. Similarly, an activating solution may be prepared by passing $SO_2$, $SO_3$, and HF gases through an aqueous medium to form an aqueous solution of hydrofluoric acid and sulfuric acid. The aqueous medium through which the gases are being passed to prepare the activating solution may or may not contain the clay to be treated.

Clay is mixed with activating solution in a sufficient amount to form a slurry of between about 25 and about 40% solids by weight. It is preferred that the slurry contain the maximum amount of solids that can be readily pumped through pipes and other processing equipment. Generally the maximum solids concentration of a slurry of this type which may readily be conveyed by conventional means is about 40% solids by weight, but slurries having higher solids concentrations may be used.

Various methods of preparing a slurry of clay, water, fluorine material, and mineral acid may be used. In a preferred embodiment of the invention, montmorillonite clay as mined, or which has been previously dried, is mixed with sufficient water to form a substantially homogeneous slurry having a solids content of about 40% by weight. Aqueous solutions of a fluorine compound and a mineral acid in the above-mentioned amounts, are mixed with this clay-water slurry. In another embodiment of the invention, montmorillonite clay is mixed with an aqueous solution of a fluorine compound and a mineral acid in the above-mentioned amounts, and agitated until substantially homogeneous.

Clay and activating solution are agitated in a sutiable container and heated to a temperature between about 60° C. and the boiling point and preferably between about 95° C. and the boiling point. Activation of the clay can be accomplished at these temperatures in a period of between 4 to 10 hours, the time of activation being longer at the lower temperatures. Activation of the clay can be accomplished at temperatures below about 60° C. but extended reaction times are necessary in this case.

During the digestion of clay with activating solution, it is desirable to maintain a constant level of slurry in the digester in order to insure intimate contact of clay with activating solution and to prevent an increase in the concentration of acidic components of the solution. A relative constant slurry level may be maintained either by providing the digester with a suitable reflux apparatus or by addition of make-up water at a rate equivalent to the rate of evaporation.

After digestion of the clay is completed, the clay is separated from the activating solution by a suitable means such as by filtration. The clay is subjected to one or more washing steps in which the clay is immersed in water and agitated to wash activating solution from the clay particles. After the pH of the wash water has a pH substantially the same as fresh water, the washing procedure is stopped, the clay is separated from the wash water, and conveyed to a suitable drying means such as an oil fired rotating dryer. The clay is heated at a temperture between about 100 and about 150° C. for a period of between about 2 and about 8 hours in order to reduce the moisture content to less than about 5% by weight of the clay. After the clay is dried it is comminuted in a suitable apparatus such as a ball mill. It it preferred that the clay be comminuted to a particle size where substantially all of the particles pass through a 100 mesh screen and about 18 to 20% of the particles are retained on a 200 mesh screen. When the particles are larger than about 100 mesh, the amount of surface area per unit of weight of the particles may be too small to accomplish an efficient decolorization of the oil. However, when the particles are smaller than about 100 mesh, the amount of surface area per unit of weight of the particles is large enough to accomplish efficient decolorization of the oil. When all of the particles are less than about 200 mesh, it may be difficult to separate these particles from the oil after the decolorizing step even though satisfactory decolorization may be obtained.

Activated clay produced in this manner may be used to decolorize vegetable and mineral oils as well as lubricating oils. In decolorizing vegetable oils, such as soy bean oil, the decolorizing efficiency of the clay is determined in accordance with the following procedure, which is a modification of the Official Method of the American Oil Chemist's Association, Cc 8b–49.

About 100 grams of refined soybean oil which had been treated with sodium hydroxide to precipitate free fatty acids, but which had not been decolorized, was mixed with about 1 gram of activated clay prepared by the novel method. The mixture was agitated, heated to a temperature of about 98° C. for about 25 minutes, and filtered. Clarity of the decolorized oil was determined by comparing it with distilled water in a Beckmann model DU spectrophotometer using a light having a wave-length of about 5300 Angstrom units. The amount of light transmitted through the decolorized oil was measured in terms of percent of light transmitted through distilled water.

A standard bleaching material was used to decolorize soybean oil in an amount of 1 gram of standard material per 100 grams of oil in accordance with the above-mentioned procedure. The standard material used was the Official Activated Bleaching Earth of the American Oil Chemist's Association suitable for use until July 31, 1957. Light transmission through soybean oil decolorized with the standard material was found to be about 95%. Light transmission through soybean oil before decolorization was about 58.8%.

The efficiency of the novel activated clay in decolorizing a lubricating oil was determined in accordance with the following procedure, which is a modification of the method of the American Society for Testing Materials (ASTM) D–155–45T.

About 100 grams of lubricating oil, having a specific gravity of 0.885 and a National Petroleum Association No. 6, was mixed with about 4 grams of novel activated clay. The mixture was agitated and heated at a temperature between about 266 to 274° C. for about 30 minutes. A nitrogen atmosphere, at a pressure of about 760 mm., was maintained above the slurry during digestion to prevent oxidation of the oil. After the reaction was complete, the slurry was cooled to about 120° C. and filtered. A Union colorimeter was used to match the color of the decolorized oil with oils of standard colors. When the standard bleaching material was used to decolorize the lubricating oil in accordance with this procedure, the clarified oil was found to have a N.P.A. color of 4. Decolorizing efficiency of montmorillonite clays activated in accordance with the instant novel process, were found to be as good as or better than the standard material when used to decolorize vegetable oils and lubricating oils.

The utility of the invention is illustrated by the following examples without any intention that the invention be limited thereto. All parts and percentages are by weight unless otherwise specified.

*Example I*

A sample of Cheto clay, obtained from a deposit near Sanders, Arizona, was dried and divided into equal portions of about 300 parts each, said portions being designated as portions A through G. Chemical analysis of the clay was as follows.

| Component: | Percent by weight |
|---|---|
| $SiO_2$ | 59.7 |
| $Fe_2O_3$ | 0.70 |
| $Al_2O_3$ | 17.9 |
| $CaO$ | 2.74 |
| $MgO$ | 5.97 |
| $Cl$ | 0.04 |
| Loss on ignition | 10.47 |

Portion A was mixed with about 450 parts of water to form a homogeneous slurry. An aqueous 30% HCl solution in an amount equivalent to about 33.7 parts HCl on a dry basis, and an aqueous 24% $H_2SiF_6$ solution in an amount equivalent to about 3.75 parts $H_2SiF_6$ on a dry basis were mixed with slurry. The slurry was agitated with a mechanical stirrer, heated to about 98° C. for about 8 hours, and filtered. Filter cake was agitated with about 450 parts of warm water and filtered. The filter cake was washed with water in this manner until the pH of the filtrate was substantially the same as that of fresh water as measured by litmus paper. The filter cake was dried at about 100° C. for about 3½ hours. About 292 parts of dry clay was recovered from the drying step. The dry clay was comminuted to a particle size of about −100 mesh with about 20% −100 +200 mesh. Chemical analysis of the clay was as follows.

| Component: | Percent by weight |
|---|---|
| $SiO_2$ | 60.6 |
| $Fe_2O_3$ | 1.85 |
| $Al_2O_3$ | 15.8 |
| $MgO$ | 6.25 |
| $Cl$ | 0.38 |
| $F$ | 0.186 |
| Loss on ignition @ 900° C. | 9.25 |

About 1 gram of clay was used to decolorize 100 grams of soybean oil by the above-mentioned soybean decolorizing procedure. Decolorizing efficiency in terms of percent light transmission with respect to distilled water was about 93.7%.

*Example II*

Portion B of Example I was mixed with about 450 parts of water, an aqueous 30% HCl solution in an amount equivalent to about 30 parts HCl on a dry basis, and an aqueous 24% $H_2SiF_6$ solution in an amount equivalent to about 7.5 parts $H_2SiF_6$ on a dry basis. The slurry was treated in the same manner as portion A of Example I. About 295 parts of clay was recovered from the drying step. Decolorizing efficiency with respect to soybean oil was about 95%. The National Petroleum Association number, determined by the above-mentioned lubricating oil decolorizing procedure, was found to be about 3½.

*Example III*

Portion C of Example I was mixed with about 450 parts of water, an aqueous 30% HCl solution in an amount equivalent to about 15 parts HCl on a dry basis, and an aqueous 24% $H_2SiF_6$ solution in an amount equivalent to about 40.3 parts $H_2SiF_6$ on a dry basis. The slurry was treated in the same manner as portion A of Example I. About 301 parts of clay was recovered from the drying step. Decolorizing efficiency in terms of percent light transmission through soybean oil, was found to be about 95%.

*Example IV*

Portion D of Example I was mixed with about 450 parts of water, an aqueous 30% HCl solution in an amount equivalent to about 30 parts HCl on a dry basis, and an aqueous 50% HF solution in an amount equivalent to about 7.5 parts HF on a dry basis. The slurry was treated in the same manner as portion A of Example I. About 267 parts of clay was recovered from the drying step. Decolorizing efficiency of this material in soybean oil in terms of percent light transmission was about 95%.

*Example V*

For comparison purposes, portion E of Example I was mixed with about 450 parts of water and an aqueous 30% HCl solution in an amount equivalent to about 37.5 parts HCl on a dry basis. The slurry was treated in the same manner as portion A of Example I. About 280 parts of clay was recovered from the drying step. Decolorizing efficiency of this clay in soybean oil in terms of percent light transmission was 81.2%. It can be seen from the above examples that not only is an improved decolorizing efficiency obtained by the novel process but also an improved recovery of activated clay may be obtained.

*Examples VI–VII*

Portion F of Example I was mixed with about 450 parts of water, an aqueous 96% $H_2SO_4$ solution in an amount equivalent to about 30 parts $H_2SO_4$ on a dry basis, and an aqueous 24% $H_2SiF_6$ solution in an amount equivalent to about 7.5 parts $H_2SiF_6$ on a dry basis. The slurry was treated in the same manner as portion A of Example I. Light transmission of soybean oil treated with this material was found to be about 91.1%. For purposes of comparison, portion G was mixed with about 450 parts of water and an aqueous 96% $H_2SO_4$ solution in an amount equivalent to about 37.5 parts $H_2SO_4$ on a dry basis. Light transmission of soybean oil treated with this material was found to be only 70%.

*Examples VIII–IX*

A montmorillonite clay, obtained from the area adjacent to Aberdeen, Monroe County, Mississippi, was activated in accordance with the novel method. A typical chemical analysis of a montmorillonite clay from this area is as follows.

| Component: | Percent by Weight |
|---|---|
| $SiO_2$ | 59.0 |
| $Al_2O_3$ | 20.0 |
| $Fe_2O_3$ | 4.5 |
| CaO | 1.6 |
| MgO | 5.5 |
| Loss on ignition @ 900° C. | 8.0 |

About 300 parts of montmorillonite clay from this area were mixed with about 450 parts of water, an aqueous 30% HCl solution in an amount equivalent to about 66 parts HCl on a dry basis, and an aqueous 24% $H_2SiF_6$ solution in an amount equivalent to about 7.5 parts of $H_2SiF_6$ on a dry basis to form a homogeneous slurry. The slurry was treated in the same manner as the slurry formed from portion A of Example I. Light transmission of soybean oil decolorized with this material was found to be about 91.8%. A typical chemical analysis of clay treated in this manner is as follows.

| Component: | Percent by weight |
|---|---|
| $SiO_2$ | 70.4 |
| $Al_2O_3$ | 13.7 |
| $Fe_2O_3$ | 2.25 |
| CaO | 0.11 |
| MgO | 4.17 |
| L.O.I. | 8.36 |

For purposes of comparison, a slurry was prepared which contains about 300 parts of clay from the above-mentioned area, about 450 parts of water, and an aqueous 30% HCl solution in an amount equivalent to about 66 parts HCl on a dry basis. The slurry was treated in the same manner as the slurry formed with portion A of Example I. Light transmission of soybean oil decolorized with this material was found to be about 89.7%. A typical chemical analysis of clay treated in this manner is as follows.

| Component: | Percent by weight |
|---|---|
| $SiO_2$ | 66.8 |
| $Al_2O_3$ | 15.9 |
| $Fe_2O_3$ | 3.16 |
| CaO | 0.27 |
| MgO | 3.1 |
| L.O.I | 8.09 |

Having thus fully described and illustrated the invention, what is desired to be secured by Letters Patent is:

1. An improved process for the activation of montmorillonite clay which is useful in the decolorizing of oils and which comprises the steps of reacting clay by slurrying said clay with an acidic aqueous solution containing an inorganic fluorine-containing substance selected from the group consisting of hydrogen fluoride, fluosilicic acid, and substances affording hydrogen fluoride and fluosilicic acid in the presence of a mineral acid, and a mineral acid selected from the group consisting of hydrochloric acid, sulfuric acid, and phosphoric acid, and mixtures of at least two of these mineral acids, separating the clay from said acidic solution, washing the clay with water until substantially free of said acidic solution and heating the clay to dryness.

2. The process of claim 1 wherein the weight ratio of mineral acid to clay is between about 5 and about 25:100.

3. The process of claim 1 wherein the weight ratio of inorganic fluorine-containing substance to clay is between about 2 and about 15:100.

4. The process of claim 1 wherein the slurry of clay, mineral acid inorganic fluorine-containing substance and water contains between about 25 and about 40% by weight of solids.

5. The process of claim 1 wherein the reaction is carried out at a temperature between about 60° C. and the boiling point.

6. The process of claim 1 wherein the inorganic fluorine-containing substance is hydrogen fluoride prepared in situ.

7. The process of claim 3 wherein the inorganic fluorine-containing substance is fluosilicic acid.

8. The process of claim 3 wherein the inorganic fluorine-containing substance is hydrofluoric acid.

9. The process of claim 5 wherein the reaction is carried out for a period of between about 4 and about 10 hours.

10. The composition of matter useful in the decolorizing of oils comprised of montmorillonite clay which has been reacted with an acidic aqueous solution containing an inorganic fluorine-containing substance selected from the group consisting of hydrogen fluoride, fluosilicic acid, and substances affording hydrogen fluoride and fluosilicic acid in the presence of a mineral acid, and a mineral acid selected from the group consisting of hydrochloric acid, sulfuric acid, and phosphoric acid, and mixtures of at least two of these mineral acids, separating the clay from said acidic solution, washing the clay with water until substantially free of said acidic solution and heating the clay to dryness.

References Cited in the file of this patent

UNITED STATES PATENTS

| 1,544,210 | Bierce | June 30, 1925 |
| 2,034,996 | Slocum | Mar. 24, 1936 |
| 2,207,145 | Doht | July 9, 1940 |
| 2,333,500 | Welty | Nov. 2, 1943 |
| 2,450,317 | Voorhies et al. | Sept. 28, 1948 |
| 2,504,618 | Archibald et al. | Apr. 18, 1950 |